United States Patent
Shaw et al.

(10) Patent No.: US 10,282,425 B2
(45) Date of Patent: May 7, 2019

(54) IDENTIFYING POPULAR SEGMENTS OF MEDIA OBJECTS

(75) Inventors: Ryan Shaw, Berkeley, CA (US); Patrick Lee Schmitz, San Francisco, CA (US); Peter L. Shafton, San Francisco, CA (US); Brian Williams, San Carlos, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1369 days.

(21) Appl. No.: 11/687,940

(22) Filed: Mar. 19, 2007

(65) Prior Publication Data

US 2008/0235589 A1  Sep. 25, 2008

(51) Int. Cl.
*G06F 3/00* (2006.01)
*G06F 17/30* (2006.01)
*G11B 27/11* (2006.01)

(52) U.S. Cl.
CPC ........ *G06F 17/30053* (2013.01); *G11B 27/11* (2013.01)

(58) Field of Classification Search
CPC ................. H04N 21/4825; G06F 17/30053
USPC ............................................. 705/8; 715/739
See application file for complete search history.

(56) References Cited

U.S. PATENT DOCUMENTS

| | | | | |
|---|---|---|---|---|
| 6,421,651 B1* | 7/2002 | Tedesco et al. | ................... | 705/8 |
| 7,613,731 B1* | 11/2009 | Larson | .................. | G06F 17/212 |
| 2006/0179078 A1* | 8/2006 | McLean | ..................... | 707/104.1 |
| 2007/0011206 A1* | 1/2007 | Gupta et al. | .............. | 707/104.1 |

OTHER PUBLICATIONS

Random House Unabridged Dictionary, Copyright (c) Random House, Inc. 2006; pp. 1.*
Ryan Shaw et al., "Community Annotation and Remix: a Research Platform and Pilot Deployment", *HCM'06*, Oct. 27, 2006, Santa Barbara, CA, USA.
Patrick Schmitz, et al., "International Remix: Video Editing for the Web", *ACM Multimedia* '06, Oct. 22-27, 2007, Santa Barbara, USA.

* cited by examiner

*Primary Examiner* — Andrey Belousov
(74) *Attorney, Agent, or Firm* — James J. DeCarlo; Greenberg Traurig, LLP

(57) ABSTRACT

Against this backdrop systems and methods have been developed for identifying popular segments of media objects. A remix system is provided to users allowing the easy remixing of a library of media objects. The remixes created by the users are recorded. From this information, the relative popularity of the segments and media objects in the library are identified based on how often they appear in the user-generated remixes. Actions may then be automatically taken related to the popularity of segments and media objects such as changing payment terms, alerting users of the popular content, and notifying interested parties of the popular or unpopular content.

10 Claims, 2 Drawing Sheets

IDENTIFYING POPULAR SEGMENTS OF MEDIA OBJECTS

BACKGROUND

Video remixing refers to the act of altering pre-existing media (particularly video and audio visual) content to create a new work. Often, video remixing involves the selection of different portions of pre-existing video and audio content, such as scenes from different movies, and recombining the portions to create a new work, referred to as a "remix." These new works may be commercial in nature or may be performed to provide news or other commentary on the original works.

The standard video authoring process presents novice users with a number of obstacles. First, users must obtain some source media, usually by shooting it themselves or copying it from some other source such as DVD. The former requires a video camera and knowledge of how get the captured media onto a PC in an editable form, while the latter generally requires willingness to violate copyright law and knowledge of how to circumvent DRM systems. Assuming the user gets this far, the editing itself can be fairly straightforward using consumer-oriented editing software of the kind bundled with major operating systems. However once the creative process is complete, users often face a difficult technical process to share their edited media. This problem is akin to that faced by non-technical authors who wished to publicly share textual documents, before the advent of blogs. As a result of these obstacles, a relatively small number of computer users have actually had the experience of sharing video they have edited with others.

Despite this, video remixing has become a popular pastime and there are now many web sites devoted to distributing and commercializing video remixing. Many original works, and typically many specific scenes, often reappear in multiple remixes created by different users. For example, a particular scene because of its content, social relevance, and importance to popular culture may be used by many different users, in one form or another, in many different remixes created by unrelated users. These scenes and works are iconic to the users creating the remixes and therefore of particular relevance.

A need exists to be able to identify these iconic scenes and works for a number of reasons. For example, such works are potentially worth more than less iconic works, are sought after by the remixing community more than less iconic works, and, in addition, may provide feedback to the creators of the original works about the reasons behind the success of the original works.

It would be useful to be able to identify less popular segments and be able to categorize segments across the range of popularity. Such information may allow editors to avoid cliche in their remixes.

SUMMARY

Against this backdrop systems and methods have been developed for identifying popular segments of media objects. A remix system is provided to users allowing the easy remixing of a library of media objects. The remixes created by the users are recorded. From this information, the relative popularity of the segments and media objects in the library are identified based on how often they appear in the user-generated remixes. Actions may then be automatically taken related to the popularity of segments and media objects such as changing payment terms, alerting users of the popular content, and notifying interested parties of the popular or unpopular content.

In one aspect, the disclosure describes a method for identifying popularity of segments of media objects contained in a library of media objects. The method includes accessing a plurality of user-generated playlists, in which each playlist identifies one or more segments of the media objects from the library that are to be rendered in a sequence as a remix. In addition, the method includes determining the relative popularity of the segments of media objects identified in the plurality of playlists, based on the one or more segments of media objects identified by the plurality of user-generated playlists. The relative popularity of segments and/or media objects are then identified based on the one or more segments of media objects identified by the plurality of user-generated playlists. This popularity information is then used to trigger actions related to the segments and media objects such as changing payments terms based upon the relative popularity of content and notifying one or more potentially interested parties of the popularity of the specific segment or media object.

In another aspect, the disclosure describes a system for identifying popular segments of media objects. The system includes a datastore containing a plurality of playlists created by a plurality of users, in which each playlist identifies one or more segments of media objects that are to be rendered in a sequence as a remix. The system also includes a remix analysis module that analyzes the plurality of playlists and, based on the segments identified in the plurality of playlists, calculates the popularity of segments. The remix analysis module may then perform actions related to the segments and media objects such as changing payment terms based upon the popularity of content and notifying one or more potentially interested parties of the popularity of the specific segment or media object.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
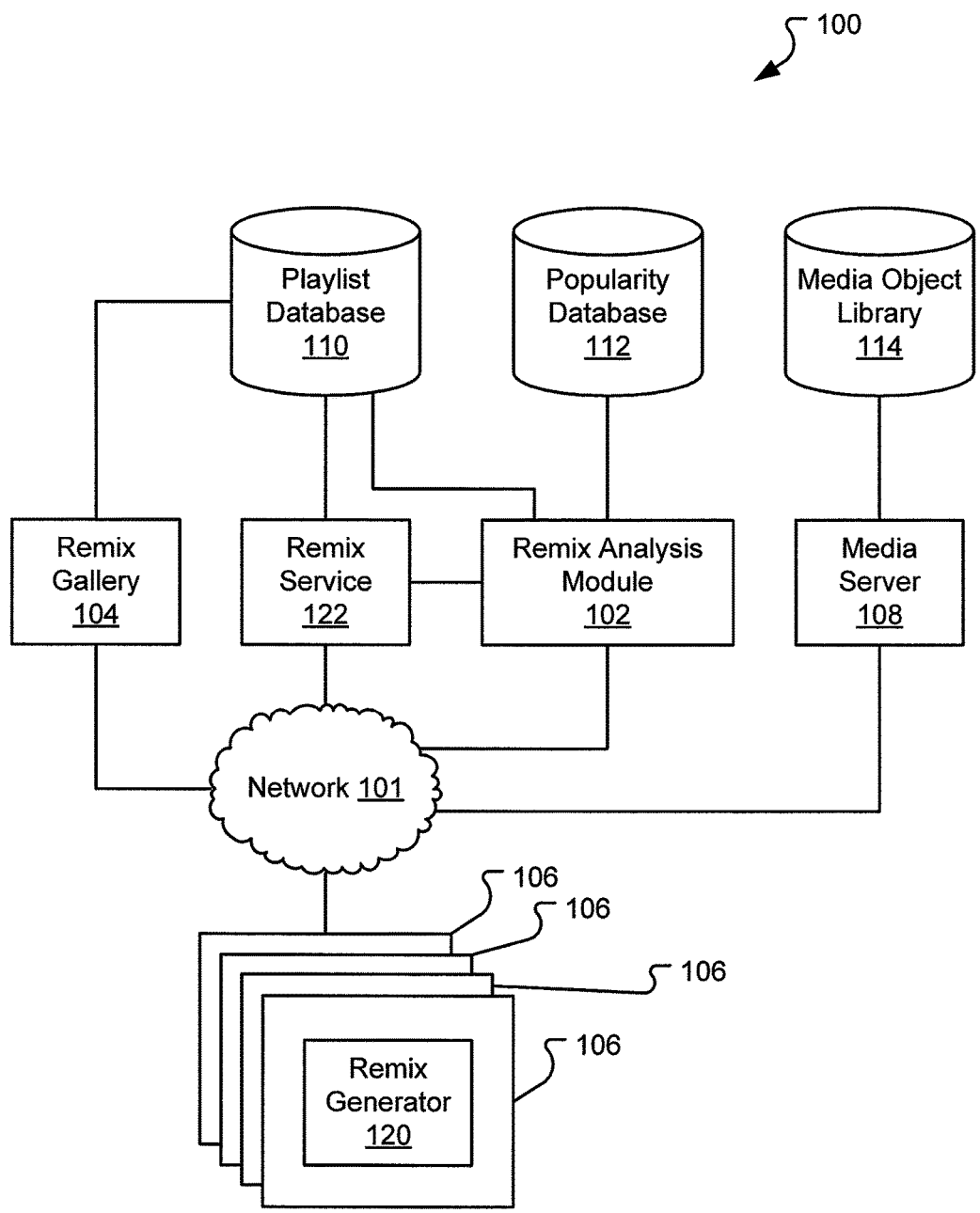
FIG. 1 illustrates an embodiment of a system that allows clients to create video remixes from original works.

FIG. 1 illustrates an embodiment of a system that allows clients to create video remixes from original works. The system further monitors the remixes created by each client and records metadata identifying what original works, and what portions of original works, are selected by the clients to be included in their remixes.

For the purposes of this disclosure, media content (whether it is audio, video or audio/visual content) that exist as a renderable data structure stream (such as a renderable media file, e.g., a movie stored in an MPEG-3, MPEG-4, .AVI or other format) in storage or memory will be referred to as a media object. Portions of media objects, such as specific scenes, sound clips, etc. will be referred to as segments. This terminology is useful as the remixing system in FIG. 1 does not create a new media object when a client 106 creates a new remix. Rather, what is created is a playlist which is a data structure containing information defining which segments of pre-existing media objects are to be played in response to a request to render the remix. From the client's perspective, the client may not be aware that there is no renderable media object that corresponds to a remix. The term remix, then, will be used to refer to the ephemeral stream of media data that may be generated in real time and transmitted to and rendered on a client in order to differentiate a remix from the playlist data structure which may contain no media data and the data structure of a media object. This would also apply even if new media (e.g., a media file) was created for each segment or remix, so long as the relationship to the original content was maintained.

The system 100 illustrated in FIG. 1 includes one or more client computing devices (clients 106). In the embodiment shown, clients 106 include a remix generator 120 that may run within the client's web browser or may be a standalone software application. Through the remix generator 120, users can edit, render and generate remixes and have the resulting playlists stored at a remote location such as within a playlist database 110. In an embodiment, the client may be a MACROMEDIA FLASH application and thus will run within any web browser that supports the appropriate Flash Player plug-in. Other applications may also be used including those based on the REAL player or similar software providing the same capabilities.

Users interact through a remix generator interface displayed on the client 106 to review media objects in the library 114, define and select segments of the media objects, assemble the segments into a remix and "store" the remix with the remix service 122. When storing the remix, in one embodiment, the remix generator creates the playlist and other metadata and transmits them to the remix server 122 for storage in the playlist database 110. Playlists may take many different forms. In an embodiment, a playlist is an XML document that includes such information as an identifier of a creator, a title, and a list of segment definitions. The segment definitions may identify a media object in the library 114, and a start time and end time of the segment. Other information including such things as a descriptive tag may also be included in the segment definition or in the playlist to be associated with the remix as a whole. An exemplified XML playlist file with three segments is provided below. The playlist includes a playlist ID, a title, a user identifier, a creation date and time identifier, a list of segments including directions concerning how audio in some of the remixes are to be treated, and a identification of a soundtrack audio media object to used as a background audio track when rendering the remix.

```
<Playlist>
    <ID>199</ID>
```

-continued

```
    <Title>My Remix</Title>
    <User>peter</User>
    <Date>1144297981</Date>
    <Segments>
        <Segment>10285</Segment>
        <Segment mute="true">10281</Segment>
        <Segment mute="true">10280</Segment>
        <Segment>10282</Segment>
        <Segment>10283</Segment>
    </Segments>
    <Soundtrack>
        <ID>10026</ID>
        <Volume>1</Volume>
    </Soundtrack>
</Playlist>
```

Each playlist segment definition may be stored within the playlist or separately. An exemplified XML representation of a playlist segment is provided below in which the segment identifies a media object (in the <Media> element in this case with an ID number that corresponds to a media object in the library) and a start and end time (in the eponymous elements). Note also the segment definition includes a <Title> element with a user-defined title of the segment and a <Tag> element that includes a set of one or more user-defined tags or keywords that are descriptive of the contents of the segment.

```
<Segment>
    <Media>10054</Media>
    <Start>35.533</Start>
    <End>43.941</End>
    <Title>Dazed (2)</Title>
    <Tag>Dog, Labrador Retriever, Fetch, Rock Hudson</Tag>
</Segment>
```

Note that tags are a form of metadata and may be provided by the users and also by the system. For example, each media object may be pre-segmented and each segment may be listed with tags identifying such things as the subject matter (e.g., sports, news, movie), genre (e.g., baseball, science fiction, romance), and actors/people (e.g., Rock Hudson, Lance Armstrong, Jeff Lowe). Such system provided tags may be incorporated into the segment definitions created by the users or, alternatively, may be accessed by the remix analysis module 102 when analyzing the popularity of the segments as described below. Many other ways of associating metadata with the segments and media objects are also possible and any suitable way may be incorporated into the systems and methods described herein.

In an embodiment, the remix generator 120 communicates with a remix web service 122 using XML messages sent via HTTP over a network 101. The network 101 may be a public network such as the Internet or may be any other communication network. The remix web service 122 handles persistent storage, retrieval and querying of playlists. The web service adheres to the REST architectural style for distributed hypermedia systems to ensure scalability and allow the use of standard web intermediaries such as proxy caches.

In the embodiment shown, a remix gallery 104, which may be a web page listing or other portal allowing access to the existing playlists in the playlist database 110, is provided. The remix gallery allows browsing and viewing of previously submitted remixes. Through the remix gallery 104, clients 106 can find and access existing playlists, either to render a remix or edit the remix to create a different remix.

Upon accessing the playlist from the gallery 104, the client 106 is redirected to the remix service 122 to handle the access request. In an embodiment, both the web service and the gallery site may be PHP5 applications running on an Apache web server, using a MySQL database for persistence.

A media server 108 is provided that handles on-demand splicing and serving of remixed video generated from the media objects stored in the media object library 114. The media object library 114 may be a single database or repository of media objects or may be a plurality of sources of media objects to which the media server 108 has access. In an embodiment, the media server 118 may be a standalone custom C++ application that serves remixed Flash Video files over HTTP.

The client interface of the remix generator 120 allows users to select and view media objects in the library 118, and then choose specific segments of the media objects using standard trimming controls. These segments can be saved, such as to a personal clip bin, and then sequenced together on a timeline to create a new remix. In the system 100, users can independently remix audio and video segments. For example, in an embodiment users can select a background soundtrack (which may span video segments to help unify the remixed video segments), and can then selectively enable or mute the audio for each segment in the remix. The client also supports playback and submission of the remix to a public gallery 104.

The remix service 122 supports queries for and updates to playlists and metadata contained in the playlist database 110 describing source media objects, media segments, and remixes. In addition to storing playlists, the playlist database may also store metadata related to the playlists. For example, in an embodiment the library 110 stores metadata describing the user that created each playlist (e.g., demographic data, user name, etc.), the number of times a playlist has been rendered by the public or remixed by other users, and user-generated tags that describe the playlist or segments within playlists or media objects.

In an embodiment, when the client initializes the remix generator 120, the remix generator 120 queries the remix service for the lists of source media objects, user-defined segments and in-progress remixes. Changes made by end users to segments and remixes may be immediately persisted to the server via asynchronous calls to the remix service 122. In an embodiment, the media server 108 handles all requests for video playback and thumbnails shown within the client interface.

In an embodiment, to serve video for a given remix, the media server 108 first queries the web service for the segments that constitute the remix (as identified in the playlist) and then splices the appropriate pieces of the source media objects into a media stream which is then streamed to the client, such as via standard HTTP. As part of the slicing and transmitting of the media data, a temporary or persistent media object may or may not be created depending on the embodiment.

The system 100 provides users with a web based interface for browsing and viewing an archive of source media objects in which they can immediately move to editing that video to create remixes. In an embodiment, users need no special software other than a web browser, and because, like blogging, the entire editing process is web-native, users can progress smoothly from authoring to sharing. Technical details regarding file formats, compression rates, and storage space may be hidden from the user, enabling the user to focus on the task of creating remixes.

To publicly share a finished remix, the user submits the work to the remix gallery 104, which results in the creation of a playlist defining the remix in the playlist database 110. Since a remix may include media from a number of different sources, a single thumbnail image is considered generally not sufficient for representing remixed content. In an embodiment, the submission interface allows the user to select up to five keyframes from their remix to be displayed in the gallery. This approach also allows the system 100 to gather statistics on which frames of video are chosen as most representative by human users, for later use in training algorithms to select representative keyframes.

The system 100 displayed, in addition to enabling the user creation of remixes from media objects in the library, also monitors the created playlists in order to identify popular media objects and popular segments within the media objects. Such information is valuable and may be used in many different ways, e.g., for determining a proper license fee or value of media rights in media objects, for identifying popular media within various user demographics in order to focus advertising or other efforts, for determining what media segments to display or present to users of the remix system so that they can find the most popular media segments quickly.

In order to analyze the playlists, the system 100 is provided with a remix analysis module 102. The module 102 may be located on the media server 108, may be integrated with the remix service 122, or may be an independent system. The module 102 analyzes the playlists in the playlist database 110 in order to identify the media objects and the various media object segments that have been selected by the users for inclusion in a remix. The module 102 may have direct access to the playlist database 110 or may access the database through the remix service 122.

In a simple embodiment, the module 102 may perform a simple analysis in which the number of times each segment is used in playlists in the library is counted and the relative number for each segment is used as the relative rank of popularity, with the most used segments being deemed the most popular. Other analyses based on the playlist data are also possible, such as determining how many times a remix is played or accessed and including this metric in the analyses when determining popular segments. Analyses may be performed to determine popularity within categories (e.g., most popular science fiction segments, sports segments, news segments, etc.) or within demographics (e.g., most popular segments for female remixers, for remixers over the age of 30, etc.).

Figure 2:
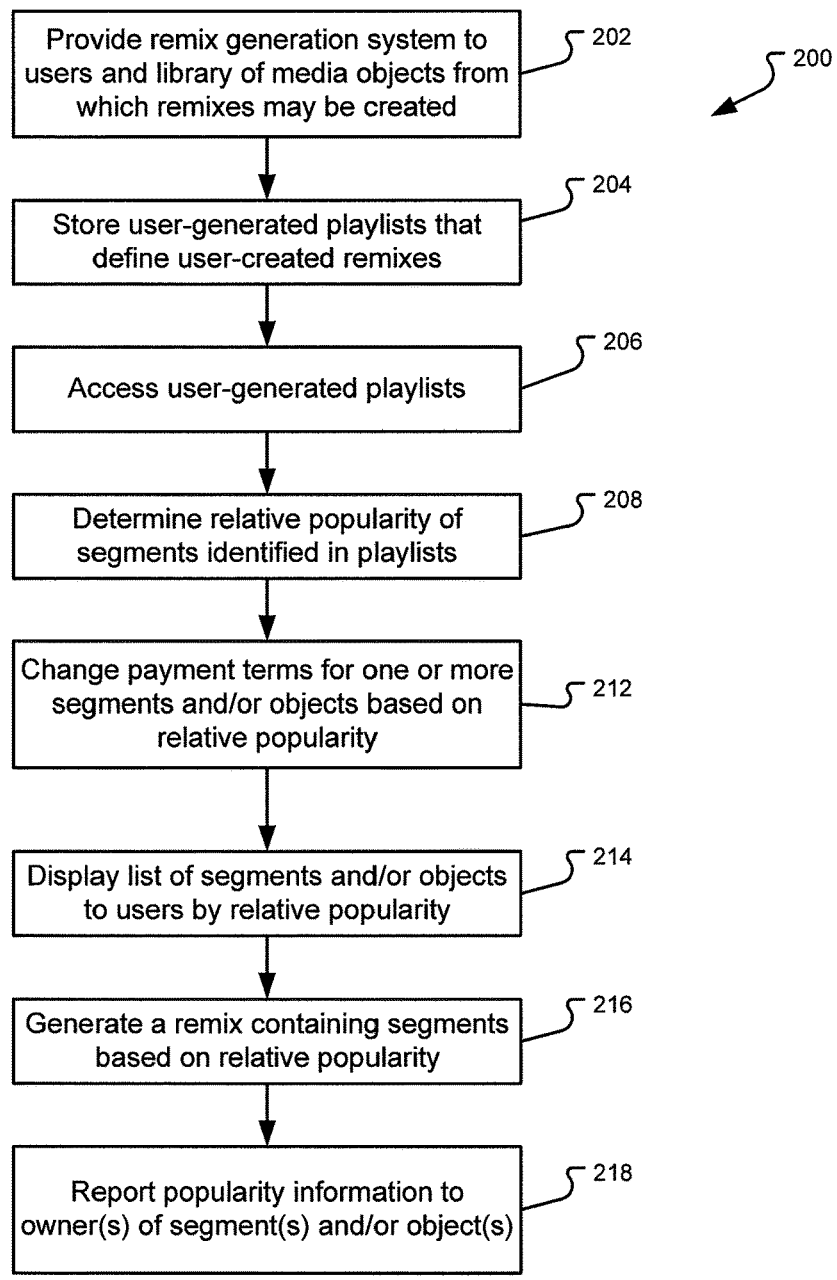
FIG. 2 illustrates an embodiment of method for identifying popular segments of media objects contained in a library of media objects.

FIG. 2 illustrates an embodiment of method for identifying the popularity of segments of media objects contained in a library of media objects. In the embodiment, the method 200 starts with providing a remix generation system, such as the system 100 described above, to one or more users in a provide system operation 202. The provide system operation 202 may further include providing a library pre-selected media objects for the user to use as source material. The media objects may be selected based on availability or may be selected as a test set of media objects in order to determine the relative worth of each media object in a controlled environment.

As the users interact with the system, select segments and create remixes of the media objects, the resulting playlists are stored in a store playlists operation 204. In an embodiment, the playlists are stored in a database such as the playlist database as described above and access to the remixes is provided through a portal such as the remix gallery also described above.

Subsequent to the creation and storage of playlists, the system accesses the playlists and analyzes them in an access operation 206. The access may involve determining how many times each segment was used, who used which segments, how the segments are tagged, or how many times each playlist has been requested by members of the public. In an embodiment, an analysis may be performed to identify and define specific segments that in part or in whole reappear multiple times in different playlists. As segments are user defined it is unlikely that different users will define a given segment in exactly the same way. For instance, one user may start a segment a few seconds before another user, even though they both intend to use the same scene. To account for this, the system may then identify a standardized segment definition in order to accurately count the popularity of the common content being used in remixes. The system may then define a popularity function over the duration of the media, together with a common segmentation of the media based upon popular use.

Based on the information obtained in the access operation 206, the system determines the relative popularity of each of the segments that appear in playlists known to the system in a popularity determination operation 208. As described above, popularity may be determined by a simple ranking of the number of times a segment was used in playlists analyzed. Alternatively, a more involved analysis may be performed utilizing any of the data stored in the playlist library and any other data, such as user demographic data, that may be identified from other sources (e.g., a user database of user information) using the data obtained from the playlists and or playlist database.

After the relative popularity of the segments is determined, the most popular and the most unpopular segments and media objects may be identified, as well as those falling within a specified range of popularity. As described above, the analysis may further identify the most popular segments within specified categories depending on the particular information being sought by the system operators. For example, in an embodiment the determination operation 208 may be performed in a manner similar to running a database report in which the operator may enter a set of criteria to be used in the popularity analysis, e.g., in order to identify the most popular baseball segment within a certain time period or most popular segment containing a certain actor.

In the method 200 illustrated, this popularity information is then used as a trigger to perform one or more actions. The actions can be performed automatically if the popularity of a specific segment or media object surpasses some predetermined threshold. Such a threshold may be relative, i.e., actions are performed automatically for the ten most popular segments within a time period, or may be absolute, i.e., the action may be performed upon determination that a segment has been used one hundred times, or downloaded and rendered one thousand times.

Furthermore, as the system may determine the relative popularity of each of the segments, actions may be performed based on several different thresholds. For example, while certain actions may be performed for more popular segments, less popular segments (e.g., segments falling below some predetermined threshold, or out of some predetermined range) may have different actions performed, such as removal from the popular segments listing for instance. Thus, the system provides for automatically performing any of a range of desired actions based on the relative popularity of the segment, and does not just identify and perform actions on the most popular segments.

In the embodiment shown, one action is a change payment terms operation 212. In this operation 212, because of the popularity of a segment as determined in the identify operation 210, payment terms associated with the use, the rendering or the access to a segment or media object may be altered. For example, a cost to use or display the segment may be increased in order to capitalize on its popularity or in order to comply with a contract term or other term of use. Other payment terms that may be changed include changing a cost to place an advertisement associated with the one or more most popular segments on a web page or at the beginning or end of the remix, changing a cost to include one of the one or more most popular segments in a remix to the remix creators; or changing a cost to render a remix by a member of the public containing one of the one or more most popular segments.

Another action is a display popular segments operation 214. In this operation 214, a standardized segment is generated for use by other users in their remixes. A list of these standardized segments of each of the most popular segments is then presented to the user within the remix generator interface, allowing quick and easy incorporation of the popular content in subsequent remixes. The system may further list all the standardized segments by relative popularity and allow the user to sort and order the list by popularity for easy identification of more or less popular segments. Popularity categories may also be used such as "top ten" segments, "top 10%" segments, "top 25%" segments, and least popular "bottom 10%" segments.

Another action may be to automatically generate a summary of the more or less popular segments. The user or the system could pick a desired summary duration (e.g., 30 seconds) and then the system may assemble the most popular 30 seconds drawn from each of the most or least popular segments. Alternatively, the system could automatically generate a remix containing standardized versions of the most popular segments, such as in the order of popularity. This automatically generated remix is then listed in the remix gallery for public consumption as would any other user-created remix. Thus, the public may quickly and easily see the most popular segments.

Yet another action may be to automatically report the results of the identification operation 210 to potentially interested parties in a notification operation 218. For example, rights owners of popular media objects may be notified so as to take the information into account when negotiating royalty and usage licenses. As another example, marketing and advertisers may be interested in order to quickly identify what is popular and also identify new trends in popularity of media content.

Many other actions may be performed based on the relative popularity of segments determined by the method 200. For example, rather than simply charging more for the most popular segments, an owner might adjust the cost across the entire range of segments as a function of the popularity. This will increase the income from popular segments, but can also motivate use of the less popular bits by dropping the price.

The popularity information may also be combined with other information known about the segments or metadata for the segments to determine the popularity of elements within the segments. For example, for a given segment, such other information may include such elements as the actors, the settings, the genre, the director, the subject matter, the release date, and/or any product placements within the segment, to name but a few. When the popularity information is combined with this additional information about the segments, a more complex pricing model can be built if we provide the full popularity ranking, and not just the most popular.

The popularity results may be provided to the end users of the system. This would allow a novice remixer to find popular segments, but also allow a somewhat more sophisticated remixer to identify less popular segments that are not so popular as to be cliched. A remixer creating a deliberately obscure remix might specifically want to find fairly unpopular segments that viewers would not easily recognize.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, when analyzing the relative popularity of different segments, segments that are repeated within a playlist may be treated differently than segments that appear only once in a playlist. As yet another example, audio segments may be tracked and their popularity may be determined as well as video segments. This may allow for the quick identification of likely valuable new ringtones and new music of interest to marketers and advertisers, as well as to the community of remix creators. As yet another example, actions may be performed in response to any identifiable triggers, criteria or threshold including actions to be performed only for newly popular content, popular content within a category, or popular content within a geographic location.

Numerous other changes may be made which will readily suggest themselves to those skilled in the art and which are encompassed in the spirit of the invention disclosed and as defined in the appended claims.

What is claimed is:

1. A method comprising:
accessing, via a computing device, a plurality of user-generated playlists, each playlist identifying one or more segments of media objects contained in a library of media objects that are to be rendered in a predetermined sequence, each identified segment of a media object comprising a portion of, and not the entire media object of which it is a segment;
accessing, via the computing device, a popularity database, said popularity database comprising information indicating how frequent each segment appears in each user-generated playlist, said popularity database further comprising segment definitions for each segment of each user-generated playlist, each segment definition comprising information identifying a respective media object in the library from which a segment is identified, information indicating how media of the segment is to be rendered, and a start time and end time of the identified segment within the respective media object;
determining, via the computing device upon accessing the popularity database, the relative popularity of the segments of media objects based on the frequency information for each segment and the segment information for each segment;
identifying, via the computing device, a set of most popular segments of media objects based on the determination of relative popularity of the segments, common content comprised within each respective most popular segment, and user-supplied popularity criteria; and
generating, via the computing device, a remix from said user-generated playlists based on said identified set of most popular segments and the segment definition for each of the most popular segments, said remix being an ephemeral stream of media data generated in real-time upon said identification occurring that is automatically communicated to a client device.

2. The method of claim 1 wherein identifying further comprises:
determining a relative popularity of the one or more segments of media objects based on the user-generated playlists.

3. The method of claim 1 further comprising:
providing a remix generation system through which users can generate a playlist comprising one or more segments of media objects that are to be rendered in a sequence as a remix.

4. The method of claim 1 further comprising:
collecting the media objects in the library; and
providing access to the media objects in the library to at least one remix generation system under control of a user.

5. The method of claim 2 further comprising:
changing a payment term for at least one segment based upon the relative popularity of the at least one segment.

6. The method of claim 3 further comprising:
displaying an indication of the relative popularity of the one or more segments to users of the remix generation system.

7. The method of claim 1 further comprising:
generating a popularity playlist based on the relative popularity of the one or more segments, the popularity playlist containing one or more segments selected based their relative popularity.

8. The method of claim 1 further comprising:
reporting to an owner of a segment information identifying the segment's relative popularity.

9. The method of claim 2 further comprising:
identifying a relative popularity of media objects in the library based on the relative popularity of segments of media objects identified by the plurality of user-generated playlists.

10. A computing device comprising:
a processor; and
a non-transitory computer-readable storage medium for tangibly storing thereon program logic for execution by the processor, the program logic comprising:

logic executed by the processor for accessing, via the computing device, a plurality of user-generated playlists, each playlist identifying one or more segments of media objects contained in a library of media objects that are to be rendered in a predetermined sequence, each identified segment of a media object comprising a portion of, and not the entire media object of which it is a segment;

logic executed by the processor for accessing, via the computing device, a popularity database, said popularity database comprising information indicating how frequent each segment appears in each user-generated playlist, said popularity database further comprising segment definitions for each segment of each user-generated playlist, each segment definition comprising information identifying a respective media object in the library from which a segment is identified, information indicating how media of the segment is to be rendered, and a start time and end time of the identified segment within the respective media object;

logic executed by the processor for determining, via the computing device upon accessing the popularity database, the relative popularity of the segments of media objects based on the frequency information for each segment and the segment information for each segment;

logic executed by the processor for identifying, via the computing device, a set of most popular segments of media objects based on the determination of relative popularity of the segments, common content comprised within each respective most popular segment, and user-supplied popularity criteria; and logic executed by the processor for generating, via the computing device, a remix from said user-generated playlists based on said identified set of most popular segments and the segment definition for each of the most popular segments, said remix being an ephemeral stream of media data generated in real-time upon said identification occurring that is automatically communicated to a client device.

\* \* \* \* \*